United States Patent
BenHanokh et al.

(10) Patent No.: US 12,204,999 B2
(45) Date of Patent: Jan. 21, 2025

(54) MANAGING RESOURCE ALLOCATION IN A SOFTWARE-DEFINED SYSTEM

(71) Applicant: Red Hat, Inc., Raleigh, NC (US)

(72) Inventors: Gabriel Zvi BenHanokh, Tel-Aviv (IL); Orit Wasserman, Mitzpe Aviv (IL)

(73) Assignee: Red Hat, Inc., Raleigh, NC (US)

( * ) Notice: Subject to any disclaimer, the term of this patent is extended or adjusted under 35 U.S.C. 154(b) by 1055 days.

(21) Appl. No.: 17/130,815

(22) Filed: Dec. 22, 2020

(65) Prior Publication Data

US 2022/0197701 A1 Jun. 23, 2022

(51) Int. Cl.
*G06F 9/48* (2006.01)
*G06F 9/50* (2006.01)
*G06N 20/00* (2019.01)
*G06Q 30/0283* (2023.01)

(52) U.S. Cl.
CPC .............. *G06N 20/00* (2019.01); *G06F 9/485* (2013.01); *G06F 9/5077* (2013.01); *G06F 2209/501* (2013.01); *G06F 2209/5011* (2013.01); *G06F 2209/5022* (2013.01); *G06F 2209/503* (2013.01); *G06F 2209/504* (2013.01); *G06Q 30/0283* (2013.01)

(58) Field of Classification Search
None
See application file for complete search history.

(56) References Cited

U.S. PATENT DOCUMENTS

| | | | |
|---|---|---|---|
| 8,458,011 B2 | 6/2013 | Al-Dawsari et al. | |
| 9,240,025 B1 | 1/2016 | Ward, Jr. et al. | |
| 9,465,630 B1* | 10/2016 | Muniz | G06F 9/5077 |
| 9,712,374 B1* | 7/2017 | Cao | H04L 63/0227 |
| 9,888,067 B1* | 2/2018 | Yemini | H04L 67/1008 |
| 10,789,089 B2 | 9/2020 | Hari | |
| 10,832,169 B2 | 11/2020 | Blue | |
| 2013/0326507 A1* | 12/2013 | McGrath | G06F 9/4856 718/1 |
| 2014/0006465 A1* | 1/2014 | Davis | G06F 16/1752 707/827 |
| 2017/0116042 A1* | 4/2017 | Xu | G06F 9/5083 |

(Continued)

OTHER PUBLICATIONS

Cao, B., et al., "Dynamic Pricing for Resource Consumption in Cloud Service," Wireless Communications and Mobile Computing, 2018, https://www.hindawi.com/journals/wcmc/2018/4263831/.

(Continued)

*Primary Examiner* — Abu Zar Ghaffari
(74) *Attorney, Agent, or Firm* — Kilpatrick Townsend & Stockton LLP

(57) ABSTRACT

Resource allocation can be managed in a software-defined system. For example, a computing device can receive, for a container in a software-defined system, a container limit specifying a maximum value for the container. The computing device can receive, for the container, one or more benefit functions that assign a weight for the resource in the software-defined system. The computing device can determine a value for a resource is less than the container limit. In response to determining the value for the resource is less than the container limit, the computing device can allocate the resource to the container based on the weight from the one or more benefit functions.

15 Claims, 3 Drawing Sheets

(56) References Cited

U.S. PATENT DOCUMENTS

| | | | |
|---|---|---|---|
| 2017/0199770 A1* | 7/2017 | Peteva | G06F 9/5088 |
| 2018/0074855 A1* | 3/2018 | Kambatla | G06F 9/4881 |
| 2018/0267833 A1* | 9/2018 | Chen | G06F 9/45558 |
| 2019/0166019 A1* | 5/2019 | Jagadeesh | H04L 41/5054 |
| 2019/0220298 A1* | 7/2019 | Jiao | G06F 9/5077 |
| 2019/0273663 A1* | 9/2019 | Balmakhtar | H04L 41/20 |
| 2019/0384647 A1* | 12/2019 | Reque | H04L 47/83 |
| 2019/0391855 A1 | 12/2019 | Bernat et al. | |
| 2020/0104153 A1* | 4/2020 | Shibayama | G06F 3/0631 |
| 2020/0174842 A1* | 6/2020 | Wang | H04L 67/63 |
| 2020/0250006 A1* | 8/2020 | Parekh | H04L 67/1008 |
| 2021/0089361 A1* | 3/2021 | Rafey | G06F 9/45558 |
| 2021/0157655 A1* | 5/2021 | Foreman | G06F 9/5077 |
| 2021/0191751 A1* | 6/2021 | Park | G06F 9/5077 |
| 2021/0194770 A1* | 6/2021 | Bhatnagar | G06F 11/301 |
| 2021/0303328 A1* | 9/2021 | Soppin | G06F 9/5005 |
| 2022/0091900 A1* | 3/2022 | Ito | G06F 9/5077 |

OTHER PUBLICATIONS

Shaari, N.A.M., et al., "Dynamic Pricing Scheme for Resource Allocation in Multi-Cloud Environment," Malaysian Journal of Computer Science, 2017, https://www.researchgate.net/publication/316557107_Dynamic_Pricing_Scheme_for_Resource_Allocation_in_Multi-Cloud_Environment.

* cited by examiner

MANAGING RESOURCE ALLOCATION IN A SOFTWARE-DEFINED SYSTEM

TECHNICAL FIELD

The present disclosure relates generally to software-defined systems. More specifically, but not by way of limitation, this disclosure relates to managing resource allocation in software-defined systems.

BACKGROUND

A software-defined system is a system with hardware abstracted as software components. For example, a solid-state drive (SSD) can be abstracted to a virtual SSD in a software-defined system. A software-defined system can have resources, such as storage resources, compute resources, and network resources, that containers operating in the software-defined system can use during execution. A container may request resources before and during execution, and an owner of the container can be billed for the resources consumed by the container.

DETAILED DESCRIPTION

Figure 1:
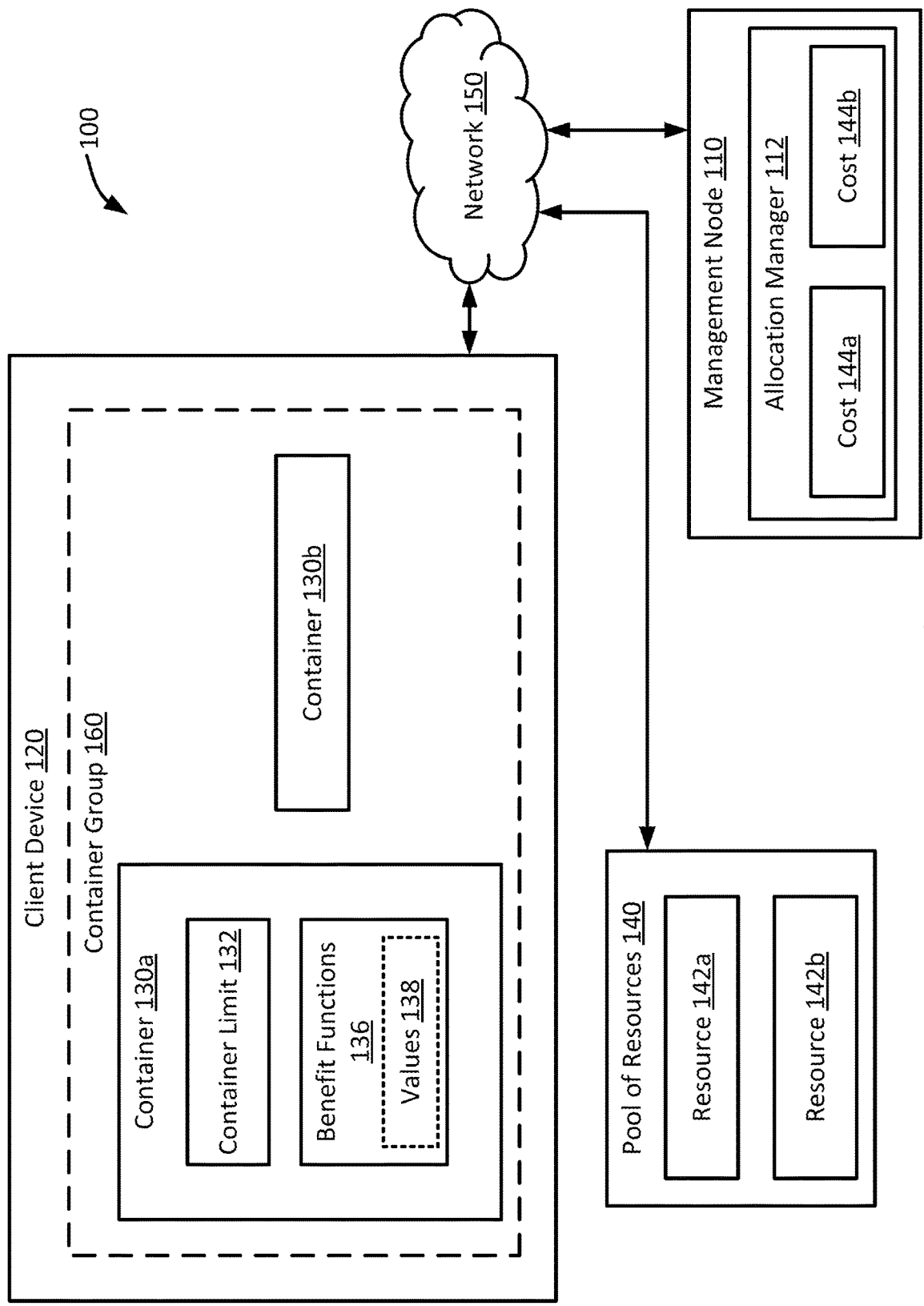
FIG. 1 is a block diagram of an example of a software-defined system implementing for resource-allocation management according to some aspects of the present disclosure.

In software-defined systems, containers can select which memory, compute, storage, and network resources to use. But containers selecting their own resources often leads to containers consuming more resources than needed for execution. Additionally, resources of a lower value may be consumed more than resources of a higher value. This may lead to resources of middle and higher values being underutilized. As a result, the software-defined system may be slower and have suboptimal resource usage.

Some examples of the present disclosure can overcome one or more of the abovementioned problems by providing a system that can allocate resources to containers based on characteristics of the containers and of the system. The system can receive a container limit specifying a maximum value for a resource. The system can determine that a value for a resource is below the container limit. Additionally, the system can receive, for the container, one or more benefit functions that assign a weight for the resource in the software-defined system. The weight can correspond to an expected benefit from the container using the resource. In response to determining the value for the resource is less than the container limit, the system can allocate the resource to the container based on the weight from the one or more benefit functions. If the system determines the value for the resource exceeds the container limit, the system may deactivate the container and reactivate the container at a subsequent time when the value is less than the container limit. This resource allocation can allow the system to balance resource usage among containers and increase speed of the system.

A benefit function can be a function that determines an expected performance enhancement provided by a resource to a container. The expected performance enhancement can be reflected as a weight, with higher weights corresponding to greater expected performance enhancement. For example, a benefit function may be a static function that assigns a fixed weight to each resource of a particular resource type. In other examples, the benefit function can be a dynamic function that assigns a weight for a resource based on other resources that are associated with the container. Alternatively, the benefit function may be a machine-learning function that assigns a weight for a resource based on learned knowledge of the container. In some examples, a combination of more than one of these benefit functions may be used to determine the weight for a resource. The weights may then be used by the system to determine which resource to allocate to the container. For example, the system may allocate a resource with a higher weight to the container instead of a resource with a lower weight.

One particular example can involve a container in a software-defined system. An allocation manager of the software-defined system can receive a container limit of ten for the container. The allocation manager can determine a value for a solid-state drive (SSD) for the container is seven. The allocation manager can also receive a static benefit function that assigns a weight of eight for an SSD for the container. The threshold for the weight can be five. The allocation manager can determine the value is less than the container limit and the weight is above the threshold. In response, the allocation manager can allocate the SSD to the container. As a result, resources that will benefit the container the most, in both value and performance, can be allocated to the container.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a software-defined system 100 for implementing resource-allocation management according to some aspects of the present disclosure. The software-defined system 100 can include a client device 120, a management node 110, and a pool of resources 140. Examples of the client device 120 can include a desktop computer, a laptop, a mobile phone, a smart network interface card (NIC) etc. The pool of resources 140 can include resources 142a-b that are available in the software-defined system 100. Examples of the resources 142a-b can include hard disk drives (HDDs), solid-state drives (SDDs), central processing units (CPUs), graphics processing units (GPUs), random-access memory (RAM), persistent memory (PMEM), network, etc. The client device 120, the management node 110, and the pool of resources 140 can communicate over a network 150, such as a local area network (LAN) or the Internet.

In some examples, the client device 120 can execute containers 130a-b. An allocation manager 112 executing on the management node 110 can determine values for the resources 142a-b. The values can correspond to costs for the resources 142a-b. The allocation manager 112 may adjust the costs of the resources 142a-b based on the availability of the resources 142a-b in the software-defined system 100.

For example, the allocation manager 112 can determine the resource 142a is scarce in the software-defined system 100 and the resource 142b is more available. As a result, the allocation manager 112 may determine a cost for the resource 142a to be greater than a cost for the resource 142b. As one particular example, the allocation manager 112 can determine a cost 144a for the resource 142a for the container 130a is $0.50.

In some examples, the allocation manager 112 can additionally determine which resources of the pool of resources 140 to allocate to the container 130a based on properties of the container 130a and the costs. For example, the allocation manager 112 can receive a container limit 132 for the container 130a. The container limit 132 can specify a maximum value, such as a budget, for the container 130a. A user of the container 130a may provide the container limit 132. For example, the container limit 132 can specify the maximum cost of $5 for the container 130a.

In some examples, the allocation manager 112 can determine whether the cost 144a is less than the container limit 132. In other words, the allocation manager 112 can determine whether the cost of the resource 142a is within the budget for the container 130a. The allocation manager 112 can compare the cost 144a to the container limit 132 to determine whether the cost 144a is less than the container limit 132. For example, the container limit 132 can be $5 and the cost 144a for the resource 142a for the container 130a can be $0.50. As a result, the allocation manager 112 can determine the cost 144a is less than the container limit 132.

In some examples, the allocation manager 112 can also receive benefit functions 136 for the container 130a that can be used in determining which of the resources 142a-b to allocate to the container 130a. The benefit functions 136 can assign a weight for each of the resources 142a-b in the pool of resources 140. A weight can correspond to a value of an expected benefit from the container 130a using a particular resource. A higher value can indicate the container 130a will have increased performance using the corresponding resource.

In some examples, the benefit functions 136 can include one or more of a static function, a dynamic function, and a machine-learning function. For the static function, values 138 can be fixed for each resource. For example, the type of resource of the resource 142a can have a fixed value and the type of resource of the resource 142b can have a fixed value that may be the same or different than the value for the resource 142a. As one particular example, the resource 142a can be a HDD and the values 138 can include a value of "2" for HDDs. Additionally, the resource 142b can be an SSD and the values 138 can include a value of "5" for SSDs.

The dynamic function of the benefit functions 136 can assign the values 138 based on additional resources associated with the container 130a. For example, if the container 130a switches from using a SSD to using a HDD, the dynamic function can increase the values for resources with read-cache, such as RAM and PMEM, because HDDs benefit more from read-cache than SSDs. The dynamic function can continually adjust the values 138 for the resources 142a-b in the pool of resources 140 based on which resources are associated with the container 130a.

The machine-learning function of the benefit functions 136 can assign the values 138 based on online calculations. For example, the machine-learning function can determine whether the container 130a experiences expected performance with its resources, or whether additional or alternative resources can provide performance enhancement. The values 138 can be adjusted based on expected performance enhancement. As one particular example, the machine-learning function can determine the container 130a experiences a lower benefit from PMEM caching for HDD than expected because the container 130a is CPU bound. As a result, the machine-learning function can decrease the value of PMEM and increase the value of CPU. This can indicate that the container 130a should reduce usage of PMEM and increase usage of CPU.

In some examples, the benefit functions 136 include more than one of the static function, dynamic function, and machine-learning function. In such cases, the values 138 can be determined by averaging the values determined by each benefit function. For example, if the benefit functions 136 include the static function, which assigns a value of "5" for SSD for the container 130a, and the dynamic function, which assigns a value of "3" for SSD for the container 130a, the values 138 can include a value of "4" for SSD. Additionally, the values 138 may be determined based on a weighted average of the values from the benefit functions. For example, the benefit functions 136 can include the dynamic function and the machine-learning function. At a start of an execution of the container 130a, the values 138 can be determined by a weighted average that considers values from the dynamic function and the machine-learning function equally (e.g., weight of 0.5). Over time, the weighted average can consider the machine-learning function at a higher weight as the machine-learning function gains knowledge of the container 130a. For example, after the container 130a has been executing for some time, the values 138 can be determined by a weighted average of 0.2 of the values determined from the dynamic function and 0.8 of the values determined by the machine-learning function.

In some examples, the allocation manager 112 can store learned knowledge about the container 130a. The knowledge may be used to determine values for resources of similar containers executing in the software-defined system 100. For example, if container 130b is similar to container 130a, the allocation manager 112 can use the learned knowledge to determine values for container 130b.

In some examples, the allocation manager 112 can use the container limit 132 and the values 138 to determine which resources of the pool of resources 140 to allocate to the container 130a. The allocation manager 112 can determine to allocate a resource to the container 130a if the container limit 132 is above the cost 144a for the resource and the values 138 indicate the value for the resource is at or above a threshold. For example, the threshold can be a value of "5". As one particular example, the resource 142a can be a SSD. The allocation manager 112 can determine the cost 144a for SSD for the container 130a is $1.00 and the container limit 132 is $2.00. Additionally, the allocation manager 112 can determine the values 138 include a value of "6" for SSD for the container 130a, which is above a threshold of "5". As a result of the cost 144a being less than the container limit 132 and the value being above the threshold, the allocation manager 112 can allocate the resource 142a to the container 130a.

In some examples, the allocation manager 112 can temporarily deactivate the container 130a execution in response to determining the cost 144a for the resource 142a exceeds the container limit 132. Deactivating the container 130a can involve the container 130a execution being postponed or paused for later execution. The allocation manager 112 can determine the cost 144a exceeds the container limit 132 and then transmit a command for causing the container 130a to be deactivated. The allocation manager 112 can continue to monitor the cost 144a as it is adjusted based on the availability of the resources 142*a-b*. At a subsequent time, the allocation manager 112 can determine the cost 144*a* for the resource 142*a* is less than the container limit 132. In response, the allocation manager 112 can reactivate the container 130*a* so that the container 130*a* continues executing and performing operations. The container 130*a* may additionally include a maximum time limit for how long the container 130*a* can be deactivated. The maximum time limit may be specified by a user during creation of the container 130*a*. The resource allocation manager 112 can determine the maximum time limit and reactivate the container 130*a* after the maximum time limit has passed since the container 130*a* has been deactivated, even if the cost 144*a* for the resource 142*a* is not below the container limit 132.

In some examples, the containers 130*a-b* can be a container group 160. For example, the containers 130*a-b* may be associated with a same entity or organization. The container group 160 can be allocated resources from the pool of resources 140, and the allocated resources can be shared between the containers 130*a-b*. A cost for more of a resource may be less than a cost for less of a resource. For example, the cost for one-hundred seconds of one unit of CPU may be $0.50 and the cost for one-hundred seconds of three units of CPU may be $1.00. Since the container group 160 may consume more of a resource, a cost 144*b* for the resource 142*a* for the container 130*a* in the container group 160 may be less than the cost 144*a* for the resource 142*a* for the container 130*a* outside of the container group 160.

In some examples, each container of the container group 160 can have a priority. The priority for a container can be specified by a user. The allocation manager 112 can determine the priority for each container of the container group 160 and allocate resources accordingly. For example, the allocation manager 112 can allocate resources to a container with a higher priority before allocating resources to a container with a lower priority. Additionally, the allocation manager 112 may deactivate containers of the container group 160 based on the priority. For example, the allocation manager 112 can deactivate containers with lower priorities prior to deactivating containers with higher priorities.

The allocation manager 112 can determine whether to allocate the resource 142*a* to the container group 160 based on the cost 144*b* for the resource 142*a* for the container group 160. As one particular example, the container 130*a* can use one unit of CPU for one-hundred seconds and the container 130*b* can use two units of CPU for one-hundred seconds. The cost 144*a* for one unit of CPU for one-hundred seconds can be $0.50. As a result, the container 130*a* can receive CPU for $0.50 and the container 130*b* can receive CPU for $1.00. Alternatively, the cost 144*b* for one-hundred seconds of three units of CPU can be $1.00 for the container group 160. Accordingly, the container group 160 can receive CPU for $1.00 that can be shared between the containers 130*a-b*. Thus, the container 130*a* can receive CPU for $0.33 and the container 130*b* can receive CPU for $0.67 if the CPU is allocated to the container group 160. Therefore, the allocation manager 112 can determine the cost 144*b* for the resource 142*a* for the container group 160 is less than the cost 144*a* for the resource 142*a* for the container 130*a*. In response, the allocation manager 112 can allocate the resource 142*a* to the container group 160.

In some examples, the allocation manager 112 may alternatively determine the cost 144*b* for the resource 142*a* for the container group 160 exceeds the cost 144*a* for the resource 142*a* for the container 130*a*. In response, the allocation manager 112 can allocate the resource 142*a* to the container 130*a*.

It will be appreciated that FIG. 1 is intended to be illustrative and non-limiting. Other examples may include more components, fewer components, different components, or a different arrangement of the components shown in FIG. 1. For instance, although the software-defined system 100 includes one client device and two resources in the example of FIG. 1, the software-defined system 100 may include a larger number of client devices and resources in other examples. Although FIG. 1 is described with respect to containers, other examples can involve resource allocation for virtual machines in a software-defined system.

Figure 2:
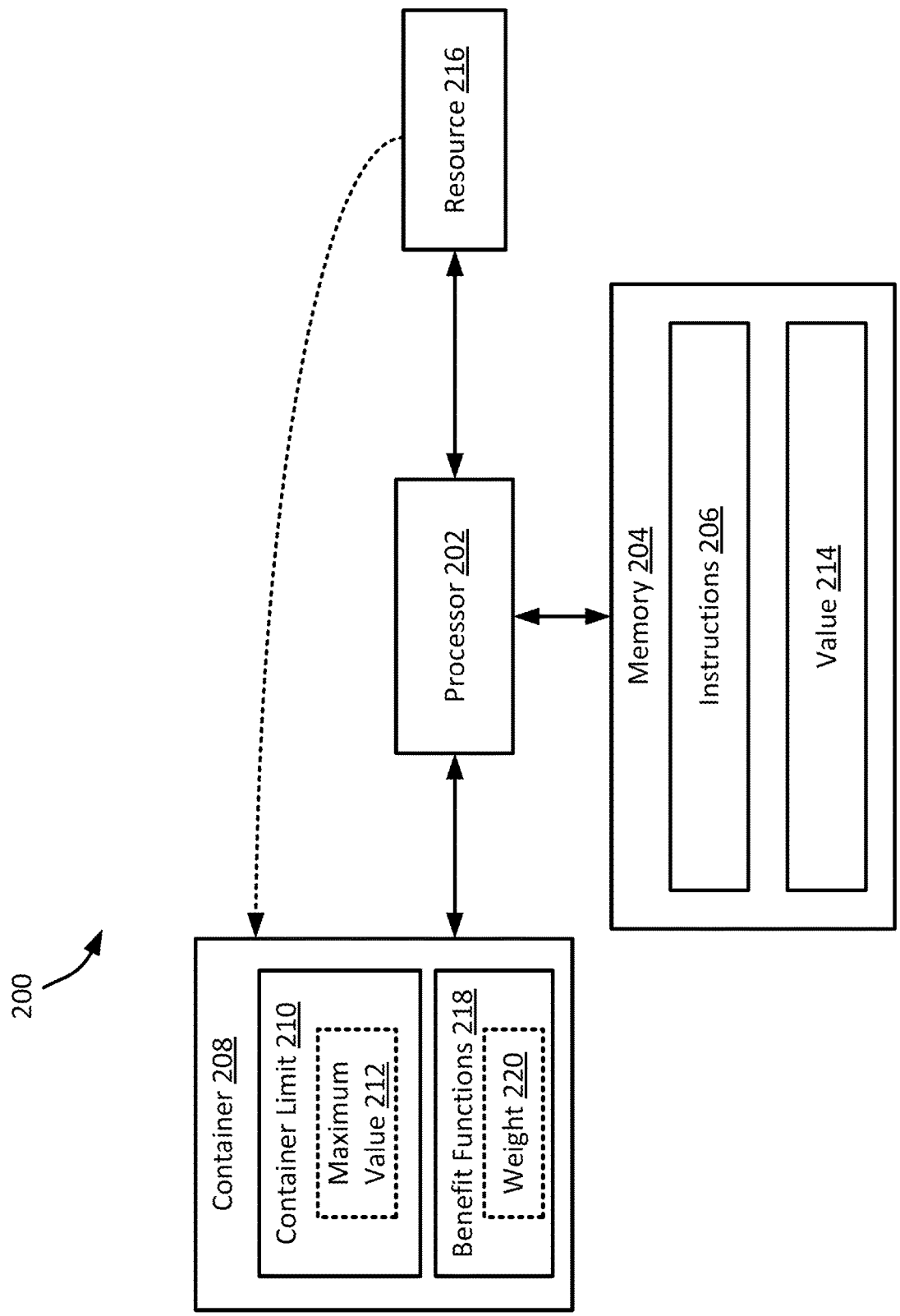
FIG. 2 is a block diagram of another example of a software-defined system for implementing resource-allocation management according to some aspects of the present disclosure.

FIG. 2 is a block diagram of another example of a software-defined system 200 for implementing resource-allocation management according to some aspects of the present disclosure. The software-defined system 200 includes a processor 202. The processor 202 may be part of a management node, such as the management node 110 in FIG. 1.

In this example, the processor 202 is communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor 202 can receive, for a container 208 in the software-defined system 200, a container limit 210 specifying a maximum value 212 for the container 208. The processor 202 can receive, for the container 208, one or more benefit functions 218 that assign a weight 220 for the resource 216 in the software-defined system 200. The one or more benefit functions 218 can include one or more of a static function, a dynamic function, and or a machine-learning function. The processor 202 can determine a value 214 for a resource 216 is less than the container limit 210. In response to determining the value 214 for the resource 216 is less than the container limit 210, the processor 202 can allocate the resource 216 to the container 208 based on the weight 220 from the one or more benefit functions 218. The processor 202 can allocate the resource 216 to the container 208 in response to determining the weight 220 is above a threshold. Dynamic allocation of resources in the software-defined system 200 may result in a faster system with balanced resource usage.

Figure 3:
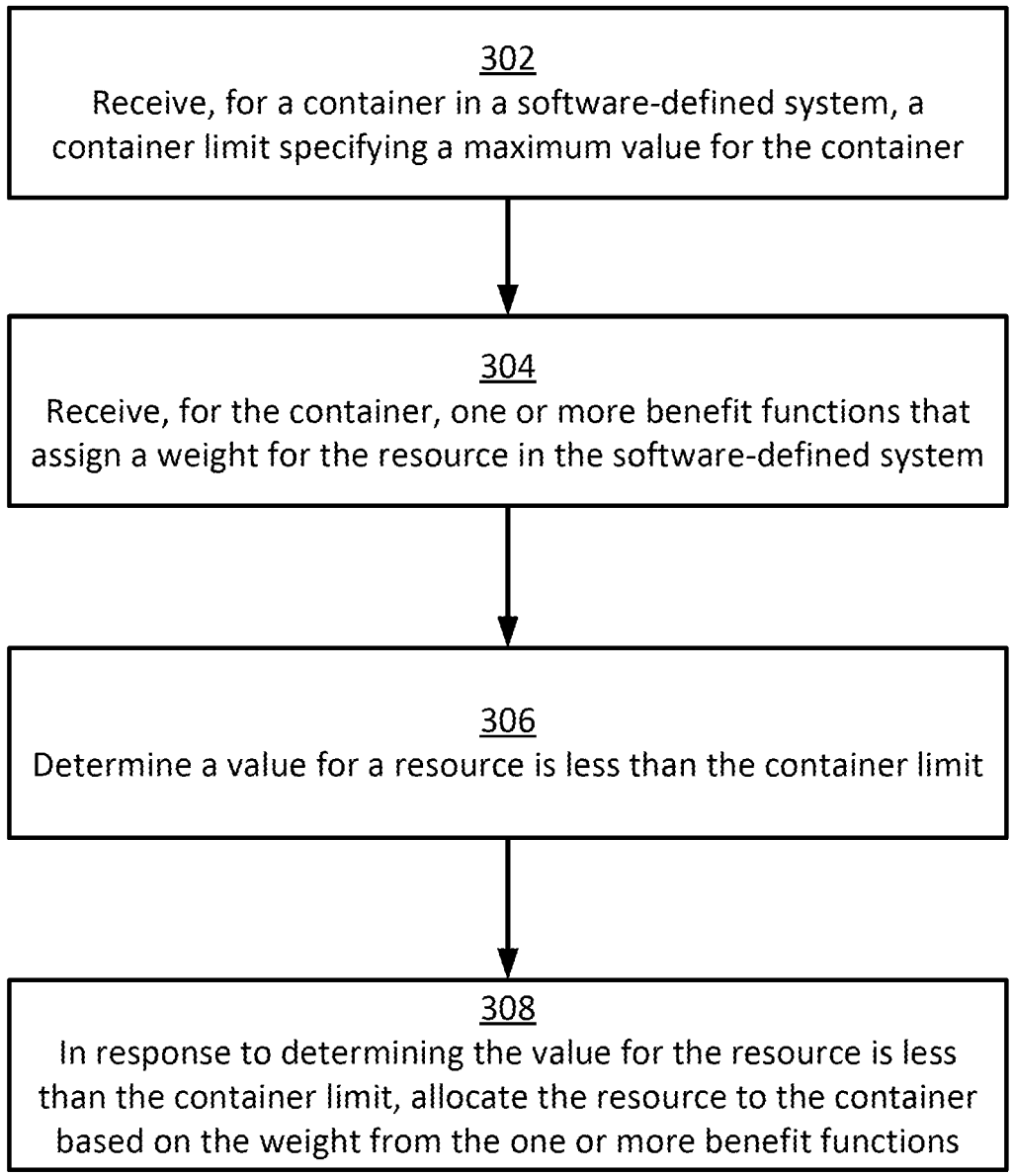
FIG. 3 is a flow chart of a process for managing resource allocation in a software-defined system according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 can receive, for a container 208 in a software-defined system 200, a container limit 210 specifying a maximum value 212 for the container 208. The maximum value 212 may correspond to a budget for executing the container 208. The container limit 210 may be fixed or may change over time.

In block 304, the processor 202 can receive, for the container 208, one or more benefit functions 218 that assign a weight 220 for the resource 216 in the software-defined system 200. The one or more benefit functions 218 can include a static function, a dynamic function, and a machine-learning function. The weight 220 may quantify performance benefits the container 208 may experience as a result of using the resource 216. For example, a higher weight can indicate a higher benefit to the container 208.

In block 306, the processor 202 can determine a value 214 for a resource 216 is less than the container limit 210. The value 214 may correspond to a cost for the resource 216 for the container 208. The value 214 being less than the container limit 210 can indicate that the cost for the resource 216 is less than the budget for the container 208.

In block 308, the processor 202 can, in response to determining the value 214 for the resource 216 is less than the container limit 210, allocate the resource 216 to the container 208 based on the weight 220 from the one or more benefit functions 218. The processor 202 can determine the weight 220 is above a threshold and then allocate the resource 216 to the container 208. Managing resource values and allocation may aid in improving resource usage and speed for the software-defined system 200.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory including instructions that are executable by the processor for causing the processor to:
receive, for a first container in a software-defined system, a container limit specifying a maximum value for obtaining resources for executing the first container;
receive, for the first container, one or more benefit functions that assign a weight to a resource corresponding to an expected performance benefit for the first container using the resource in the software-defined system;
determine that the weight for the resource is greater than a threshold;
determine a first value for using the resource for the first container outside of a container group is less than the container limit;
assign the first container and a second container to the container group;
determine a second value for using the resource for the first container in the container group is less than the first value for using the resource for the first container outside of the container group;
in response to determining the second value is less than the first value, allocate the resource to the first container in the container group; or
determine a third value for using the resource for the first container in the container group exceeds the first value for using the resource for the first container outside of the container group;
in response to determining the first value for using the resource for the first container is less than the container limit, the weight for the resource is greater than the threshold, and that the third value exceeds the first value, allocate the resource to the first container outside of the container group; and
in response to allocating the resource to the first container, activate the first container to execute using the resource.

2. The system of claim 1, wherein the memory further includes instructions that are executable by the processor for causing the processor to:
determine the first value for using the resource for the first container exceeds the container limit; and
in response to determining the first value exceeds the container limit, deactivate the first container.

3. The system of claim 2, wherein the memory further includes instructions that are executable by the processor for causing the processor to:
determine a subsequent value for using the resource for the first container is less than the container limit; and
in response to determining the subsequent value is less than the container limit, reactivate the first container.

4. The system of claim 1, wherein the memory further includes instructions that are executable by the processor for causing the processor to adjust the first value for using the resource for the first container based on an availability of the resource among a plurality of resources in the software-defined system.

5. The system of claim 1, wherein the one or more benefit functions comprise a static function, a dynamic function that assigns the weight for each resource based on additional resources associated with the first container, or a machine-learning function, and wherein the weight represents an expected performance enhancement provided to the first container by the resource.

6. A computer-implemented method comprising:
receiving, for a first container in a software-defined system, a container limit specifying a maximum value for obtaining resources for executing the first container;
receiving, for the first container, one or more benefit functions that assign a weight to a resource corresponding to an expected performance benefit for the first container using the resource in the software-defined system;
determining that the weight for the resource is greater than a threshold;
determining a first value for using the resource for the first container outside of a container group is less than the container limit;
assigning the first container and a second container to the container group;
determining a second value for using the resource for the first container in the container group is less than the first value for using the resource for the first container outside of the container group;

in response to determining the second value is less than the first value, allocating the resource to the first container in the container group; or determining a third value for using the resource for the first container in the container group exceeds the first value for using the resource for the first container outside of the container group;

in response to determining the first value for using the resource for the first container is less than the container limit, the weight for the resource is greater than the threshold, and that the third value exceeds the first value, allocating the resource to the first container outside of the container group; and in response to allocating the resource to the first container, activating the first container to execute using the resource.

7. The method of claim 6, further comprising:
determining the first value for using the resource for the first container exceeds the container limit; and
in response to determining the first value exceeds the container limit, deactivating the first container.

8. The method of claim 7, further comprising:
determining a subsequent value for using the resource for the first container is less than the container limit; and
in response to determining the subsequent value is less than the container limit, reactivating the first container.

9. The method of claim 6, further comprising adjusting the first value for using the resource for the first container based on an availability of the resource among a plurality of resources in the software-defined system.

10. The method of claim 6, wherein the one or more benefit functions comprise a static function, a dynamic function that assigns the weight for each resource based on additional resources associated with the first container, or a machine-learning function, and wherein the weight represents an expected performance enhancement provided to the first container by the resource.

11. A non-transitory computer-readable medium comprising program code that is executable by a processor for causing the processor to:
receive, for a first container in a software-defined system, a container limit specifying a maximum value for obtaining resources for executing the first container;
receive, for the first container, one or more benefit functions that assign a weight to a resource corresponding to an expected performance benefit for the first container using the resource in the software-defined system;
determine that the weight for the resource is greater than a threshold;
determine a first value for using the resource for the first container outside of a container group is less than the container limit;

assign the first container and a second container to the container group;
determine a second value for using the resource for the first container in the container group is less than the first value for using the resource for the first container outside of the container group;
in response to determining the second value is less than the first value, allocate the resource to the first container in the container group; or
determine a third value for using the resource for the first container in the container group exceeds the first value for using the resource for the first container outside of the container group;
in response to determining the first value for using the resource for the first container is less than the container limit, the weight for the resource is greater than the threshold, and that the third value exceeds the first value, allocate the resource to the first container outside of the container group; and
in response to allocating the resource to the first container, activate the first container to execute using the resource.

12. The non-transitory computer-readable medium of claim 11, further comprising program code that is executable by the processor for causing the processor to adjust the first value for using the resource for the first container based on an availability of the resource among a plurality of resources in the software-defined system.

13. The non-transitory computer-readable medium of claim 11, wherein the one or more benefit functions comprise a static function, a dynamic function that assigns the weight for each resource based on additional resources associated with the first container, or a machine-learning function, and wherein the weight represents an expected performance enhancement provided to the first container by the resource.

14. The non-transitory computer-readable medium of claim 11, further comprising program code that is executable by the processor for causing the processor to:
determine the first value for using the resource for the first container exceeds the container limit; and
in response to determining the first value exceeds the container limit, deactivate the first container.

15. The non-transitory computer-readable medium of claim 4, further comprising program code that is executable by the processor for causing the processor to:
determine a subsequent value for using the resource for the first container is less than the container limit; and
in response to determining the subsequent value is less than the container limit, reactivate the first container.

* * * * *